United States Patent
Wen

(10) Patent No.: US 12,381,725 B2
(45) Date of Patent: Aug. 5, 2025

(54) WIRELESS TERMINAL AND METHOD FOR AUTHENTICATING INTERFACE ACCESS OF WIRELESS TERMINAL IN UBOOT MODE

(71) Applicant: DRNC HOLDINGS, INC., Wilmington, DE (US)

(72) Inventor: Hailong Wen, Shenzhen (CN)

(73) Assignee: DRNC HOLDINGS, INC., Wilmington, DE (US)

( * ) Notice: Subject to any disclaimer, the term of this patent is extended or adjusted under 35 U.S.C. 154(b) by 138 days.

(21) Appl. No.: 18/026,240

(22) PCT Filed: Aug. 2, 2021

(86) PCT No.: PCT/CN2021/110126
§ 371 (c)(1),
(2) Date: Mar. 14, 2023

(87) PCT Pub. No.: WO2022/052665
PCT Pub. Date: Mar. 17, 2022

(65) Prior Publication Data
US 2023/0370262 A1    Nov. 16, 2023

(30) Foreign Application Priority Data
Sep. 14, 2020    (CN) .......................... 202010960485.4

(51) Int. Cl.
*H04L 29/06*    (2006.01)
*H04L 9/08*    (2006.01)
(Continued)

(52) U.S. Cl.
CPC ............ *H04L 9/088* (2013.01); *H04L 9/3239* (2013.01); *H04W 12/04* (2013.01)

(58) Field of Classification Search
CPC ..... H04L 9/088; H04L 9/3239; H04L 9/3263; H04W 12/04; G06F 21/62; G06F 21/6209;
(Continued)

(56) References Cited

U.S. PATENT DOCUMENTS

| | | | |
|---|---|---|---|
| 6,668,323 | B1 | 12/2003 | Challener et al. |
| 2001/0016916 | A1 | 8/2001 | Mayer |

(Continued)

FOREIGN PATENT DOCUMENTS

| | | | |
|---|---|---|---|
| CN | 104322003 A | | 1/2015 |
| CN | 105488435 A | | 4/2016 |

(Continued)

OTHER PUBLICATIONS

International Search Report for corresponding application PCT/CN2021/110126 filed Mar. 17, 2022; Mail date Sep. 28, 2021.
(Continued)

*Primary Examiner* — Malcolm Cribbs
(74) *Attorney, Agent, or Firm* — Volpe Koenig

(57) ABSTRACT

The present disclosure provides a wireless terminal and a method for authenticating interface access of a wireless terminal in a Uboot mode. The method includes: in response to an authentication request for interface access, authentication request key information carried by the authentication request is acquired; the authentication request key information is validated according to preset key validation information; when validation succeeds, interface access authority of a wireless terminal is acquired; and when the validation fails, key query information is outputted. The key query information and the key validation information are acquired according to the same plaintext key. Since an authentication step is required when the interface access authority of the wireless terminal is acquired, a security arrangement for the
(Continued)

interface access of the wireless terminal is added, such that malicious access to an interface of a wireless terminal is prevented.

18 Claims, 3 Drawing Sheets

(51) Int. Cl.
    *H04L 9/32*         (2006.01)
    *H04W 12/04*      (2021.01)

(58) Field of Classification Search
    CPC ...... G06F 21/6218; G06F 21/70; G06F 21/71; G06F 21/78
    See application file for complete search history.

(56) References Cited

U.S. PATENT DOCUMENTS

| | | | |
|---|---|---|---|
| 2007/0079143 | A1 | 4/2007 | Fazal et al. |
| 2009/0204779 | A1 | 8/2009 | Khan et al. |
| 2010/0217964 | A1 | 8/2010 | Peterka et al. |
| 2011/0087890 | A1 | 4/2011 | Munsil et al. |
| 2011/0126001 | A1* | 5/2011 | Fu .......................... H04L 63/06 713/156 |
| 2018/0332471 | A1* | 11/2018 | Zhu ....................... H04L 63/061 |
| 2021/0025938 | A1* | 1/2021 | Pöppe ............ G01R 31/318533 |

FOREIGN PATENT DOCUMENTS

| | | |
|---|---|---|
| CN | 106203035 A | 12/2016 |
| CN | 106992857 A | 7/2017 |
| CN | 107395560 A | 11/2017 |
| CN | 108965943 A | 12/2018 |
| CN | 109981562 A | 7/2019 |
| CN | 110149328 A | 8/2019 |
| CN | 110719166 A | 1/2020 |
| IN | 112257074 A | 1/2021 |
| JP | 2007095077 A | 4/2007 |
| JP | 2011150445 A | 8/2011 |
| JP | 2014081697 A | 5/2014 |
| JP | 2016085621 A | 5/2016 |

OTHER PUBLICATIONS

European Search Report for corresponding application EP21865721; Report dated Feb. 8, 2024.

Wei-guo He, Design and Implementation of Flash Safe Storage Controller, Communications Technology, vol. 53, No. 5. May 2020.

He et al., "Design and Implementation of Flash Safe Storage Controller," Communication Technology, Issue 5 (May 10, 2020).

* cited by examiner

WIRELESS TERMINAL AND METHOD FOR AUTHENTICATING INTERFACE ACCESS OF WIRELESS TERMINAL IN UBOOT MODE

CROSS-REFERENCE TO RELATED APPLICATION

This disclosure is based upon and claims priority to Chinese Patent Application No. CN202010960485.4 filed on Sep. 14, 2020, the disclosure of which is hereby incorporated by reference in its entirety.

TECHNICAL FIELD

The embodiments of the present disclosure relate to, but are not limited to, the field of wireless terminals, and specifically, to, but are not limited to, a wireless terminal and a method for authenticating interface access of a wireless terminal in a Uboot mode.

BACKGROUND

With the increasing development of a communication technology, various different wireless terminals are widely promoted and applied. The current wireless terminal generally needs to be called and acquire data by means of various interfaces. For example, a serial port of a wireless terminal is an important communication interface for software debugging and fault diagnosis in a product development stage. By means of the serial port, an operation mechanism of the wireless terminal may be understood, sensitive data and reverse firmware information may be acquired, In order to avoid malicious attack, reading or tampering, the wireless terminal only turns off some of serial port functions, while most of the serial port functions are retained to meet requirements for fault diagnosis of after-sales services, resulting in increased potential risks of the wireless terminal, such that security arrangements are required for the interface access of the wireless terminal, so as to prevent malicious access to an interface of the wireless terminal.

SUMMARY

An embodiment of the present disclosure provides an interface access authenticating method of a wireless terminal in a Uboot mode, and the technical problem to be mainly solved is that there are potential risks in interface access of a wireless terminal.

In order to solve the above technical problem, an embodiment of the present disclosure provides an interface access authenticating method of a wireless terminal in a Uboot mode, which is used for acquiring interface access authority of a wireless terminal. The interface access authenticating method includes the following operations: in response to an authentication request for interface access, authentication request key information carried by the authentication request is acquired; the authentication request key information is validated according to preset key validation information; when a validation of the authentication request key information succeeds, interface access authority of a wireless terminal is acquired; when the validation of the authentication request key information fails, key query information is outputted, and the key query information and the key validation information are acquired according to the same plaintext key.

In an embodiment, the key query information and the key validation information are acquired according to the same plaintext key includes the following operations: the plaintext key is randomly generated according to a preset password strength policy; the key validation information is generated from the plaintext key by using a first encryption algorithm, and the key query information is generated from the plaintext key by using a second encryption algorithm.

In an embodiment, the password strength policy includes a minimum password character length and a minimum number of character types included.

In an embodiment, the first encryption algorithm is different from the second encryption algorithm. The first encryption algorithm includes a symmetric encryption algorithm or a Hash algorithm; and the second encryption algorithm includes an asymmetric encryption algorithm.

In an embodiment, the first encryption algorithm includes Advanced Encryption Standard (AES), Message-Digest Algorithm version.5 (MD5) or Secure Hash Algorithm (SHA) algorithms.

In an embodiment, the second encryption algorithm includes a Rivest Shamir Adleman (RSA) or an elliptic curve asymmetric encryption algorithm.

An embodiment of the present disclosure further provides a wireless terminal, which includes a processor and a memory.

The processor is configured to execute one or more programs stored in the memory, so as to implement steps of the above interface access authenticating method. The memory is coupled to the processor.

An embodiment of the present disclosure further provides a wireless terminal, which includes an interface activating module, a storage module and an authentication module.

The interface activating module is configured to activate access authority of a serial interface of the wireless terminal.

The storage module is configured to store key validation information and key query information which are preset by the wireless terminal. The key query information and the key validation information are acquired according to the same plaintext key.

The authentication module is configured to, in response to an authentication request for interface access, acquire authentication request key information carried by the authentication request, and validate the authentication request key information according to preset key validation information; when a validation of the authentication request key information succeeds, acquire interface access authority of a wireless terminal; and when the validation of the authentication request key information fails, output key query information.

In an embodiment, the wireless terminal further includes an encryption module, which is configured to encrypt the authentication request key information according to a first preset encryption algorithm, so as to cause the authentication module to validate the encrypted authentication request key information according to the key validation information.

In an embodiment, the encryption module is further configured to randomly generate the plaintext key according to a preset password strength policy; and generate the key validation information from the plaintext key by using a first encryption algorithm, and generate the key query information from the plaintext key by using a second encryption algorithm.

An embodiment of the present disclosure further provides a computer-readable storage medium. The computer-readable storage medium stores one or more programs. The one or more programs are executable by one or more processors, so as to implement steps of the interface access authenticating method described in the above embodiments.

According to the interface access authenticating method of a wireless terminal in a Uboot mode, the wireless terminal and the computer storage medium provided in the embodiments of the present disclosure, in response to the authentication request for interface access, the authentication request key information carried by the authentication request is acquired; the authentication request key information is validated according to the preset key validation information; when the validation of the authentication request key information of the authentication request key information succeeds, the interface access authority of a wireless terminal is acquired; and when the validation fails, the key query information is outputted. The key query information and the key validation information are acquired according to the same plaintext key. In some implementation processes, since an authentication step is required when the interface access authority of the wireless terminal is acquired, a security arrangement for the interface access of the wireless terminal is added, such that malicious access to an interface of a wireless terminal is prevented.

Other features and corresponding beneficial effects of the present disclosure are described in rear sections of the specification, and it should be understood that, at least some of the beneficial effects become apparent from the records in the specification of the present disclosure.

DETAILED DESCRIPTION OF THE EMBODIMENTS

To make the objectives, technical solutions and advantages of the present disclosure clearer, the embodiments of the present disclosure are further described in detail below with reference to specific implementations and the drawings. It should be understood that, the specific embodiments described here are merely used to explain the present disclosure, and are not used to limit the present disclosure.

Embodiment 1

A serial port of a wireless terminal is an important means for software debugging and fault diagnosis in a product development stage, and also has an extremely-high utilization value for an attacker. By means of the serial port, an operation mechanism of a device may be understood, sensitive data and reverse firmware may be acquired. Functions of device serial ports of only some of items in the wireless terminal are closed, but most of the items need to retain debugging functions of the device serial ports for after-sales fault diagnosis, such that security arrangements are required to prevent unauthorized users from accessing the device serial ports. In order to protect interface access of the wireless terminal in a Uboot mode, no command other than an authentication request is not allowed to be inputted by default in the Uboot mode, and an interface console of a wireless device is not opened even after the kernel of the wireless terminal is started. For example, if a serial port command input function of the wireless terminal is to be enabled, a password is required to be inputted, and the serial port command input function can only be enabled after authentication is passed. The password is unique to each wireless terminal, and is automatically generated by the wireless terminal and stored in a Flash memory.

Figure 1:
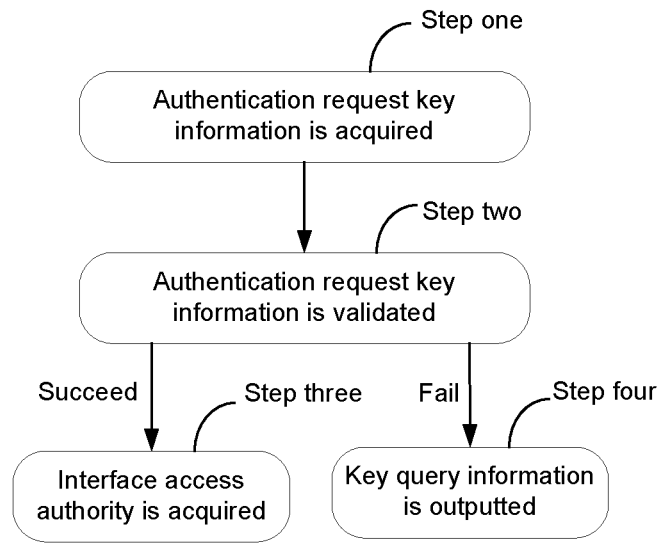
FIG. 1 is a schematic flowchart of an interface access authenticating method in a Uboot mode according to Embodiment I of the present disclosure.

FIG. 1 is a schematic flowchart of an interface access authenticating method in a Uboot mode according to Embodiment I of the present disclosure. The method is used for acquiring interface access authority of a wireless terminal, and includes the following steps.

At step one, authentication request key information is acquired.

After the wireless terminal is started up to enter the Uboot mode, a command input function of an interface is disabled. If the command input function for interface access is pre-enabled, an authentication request command carrying the authentication request key information is required to be inputted. After the authentication request is inputted in the Uboot mode, in response to the authentication request for interface access, the authentication request key information carried by the authentication request is acquired.

At step two, authentication request key information is validated.

The authentication request key information is validated according to preset key validation information. The preset key validation information is acquired according to a plaintext key. In an embodiment, the preset key validation information is acquired after the plaintext key is encrypted by using a first encryption algorithm. The acquired key validation information is first encrypted according to the first encryption algorithm; and then the encrypted key validation information is compared with the preset key validation information to validate if the encrypted key validation information is the same as the preset key validation information, if so, a validation of the authentication request key information succeeds, and if not, the validation of the authentication request key information fails. In an embodiment, the first encryption algorithm includes a symmetric encryption algorithm or a Hash algorithm.

At step three, interface access authority is acquired.

After the validation of the authentication request key information succeeds, the interface access authority of the wireless terminal is acquired. That is to say, the command input function for interface access is enabled.

At step four, key query information is outputted.

If the validation of the authentication request key information fails, the key query information is outputted. The key query information and the key validation information are acquired according to the same plaintext key. A method for acquiring the key query information and the key validation information includes the following operations.

The plaintext key is randomly generated according to a preset password strength policy. The preset password strength policy includes the plaintext key, which must include uppercase letters, lowercase letters, special characters and/or numbers. The preset password strength policy further includes a minimum password character length of the plaintext key and a minimum number of character types included. The key validation information is generated from the plaintext key by using the first encryption algorithm, and the key query information is generated from the plaintext key by using a second encryption algorithm. In an embodiment, the first encryption algorithm is different from the second encryption algorithm. The first encryption algorithm includes a symmetric encryption algorithm or a Hash algorithm; and the second encryption algorithm includes an asymmetric encryption algorithm. In an embodiment, the first encryption algorithm includes AES, MD5 or SHA algorithms. In an embodiment, the second encryption algorithm includes an RSA or an elliptic curve asymmetric encryption algorithm.

Since the key query information and the key validation information are acquired according to the same plaintext key, the plaintext key may be acquired on the basis of the outputted key query information according to the second encryption algorithm. The plaintext key is used as the authentication request key information, that is, access authentication is successful, so as to acquire the interface access authority of the wireless terminal.

By means of the interface access authenticating method of a wireless terminal in a Uboot mode provided in this embodiment of the present disclosure, in response to the authentication request for interface access, the authentication request key information carried by the authentication request is acquired; the authentication request key information is validated according to the preset key validation information; when the validation of the authentication request key information succeeds, the interface access authority of the wireless terminal is acquired; and when the validation of the authentication request key information fails, the key query information is outputted. The key query information and the key validation information are acquired according to the same plaintext key. In some implementation processes, since an authentication step is required when the interface access authority of the wireless terminal is acquired, a security arrangement for the interface access of the wireless terminal is added, such that malicious access to an interface of a wireless terminal is prevented. In an embodiment, when the validation fails, research and development or testing personnel use a private key tool including the second encryption algorithm or an IT system to decrypt the plaintext key from the key query information, and then use, at the interface, the authentication request to carry the decrypted plaintext key, so as to be inputted into the wireless terminal, thereby enabling an interface debugging function of the wireless terminal.

Embodiment 2

Figure 2:
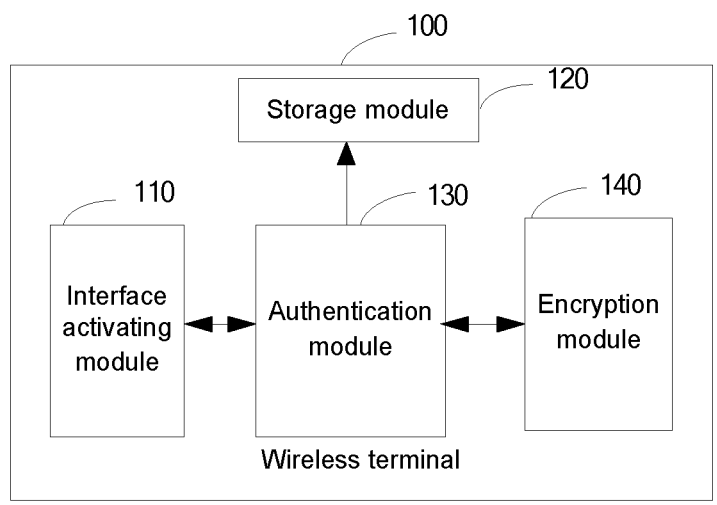
FIG. 2 is a schematic structural diagram of a wireless terminal according to Embodiment II of the present disclosure.

FIG. 2 is a schematic structural diagram of a wireless terminal according to Embodiment 2 of the present disclosure. The wireless terminal 100 includes an interface activating module 110, a storage module 120 and an authentication module 130. The interface activating module 110 is configured to activate access authority of a serial interface of the wireless terminal. The storage module 120 is configured to store key validation information and key query information which are preset by the wireless terminal 100. The key query information and the key validation information are acquired according to the same plaintext key. The authentication module 130 is configured to, in response to an authentication request for interface access, acquire authentication request key information carried by the authentication request, and validate the authentication request key information according to preset key validation information; when a validation of the authentication request key information succeeds, acquire interface access authority of a wireless terminal; and when the validation of the authentication request key information fails, output key query information. In an embodiment, the wireless terminal 100 further includes an encryption module 140, which is configured to encrypt the authentication request key information according to a first preset encryption algorithm, so as to cause the authentication module 130 to validate the encrypted authentication request key information according to the key validation information. The encryption module 140 is further configured to randomly generate the plaintext key according to a preset password strength policy; and generate the key validation information from the plaintext key by using a first encryption algorithm, and generate the key query information from the plaintext key by using a second encryption algorithm.

In this embodiment of the present disclosure, the wireless terminal includes the interface activating module, the storage module and the authentication module. The interface activating module is configured to activate the access authority of the serial interface of the wireless terminal; the storage module is configured to store the key validation information and the key query information; and the authentication module is configured to, in response to the authentication request for interface access, acquire the authentication request key information, and validate the authentication request key information according to the key validation information; when the validation of the authentication request key information succeeds, acquire the interface access authority of the wireless terminal; and when the validation of the authentication request key information fails, output the key query information. The key query information and the key validation information are acquired according to the same plaintext key.

Embodiment 3

Figure 3:
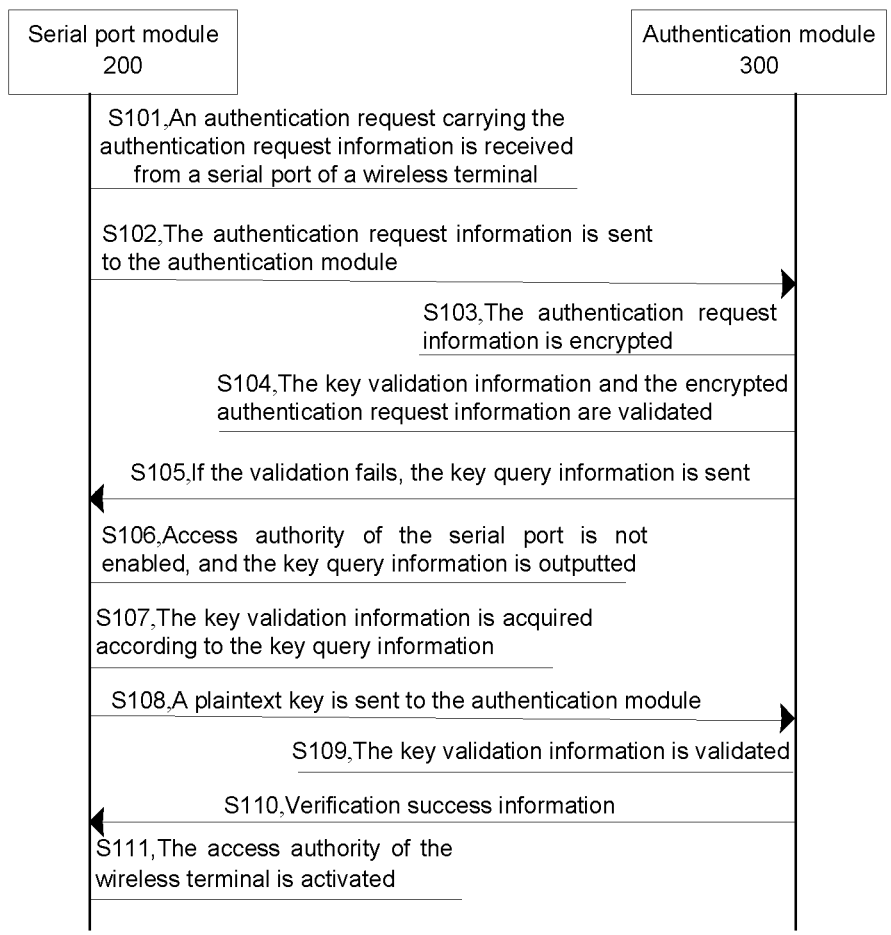
FIG. 3 is a schematic flowchart of an access authenticating method of a serial interface of a wireless terminal according to Embodiment III of the present disclosure.

FIG. 3 is a schematic flowchart of an access authenticating method of a serial interface of a wireless terminal according to Embodiment 3 of the present disclosure. The method is used for acquiring access authority of a serial interface of the wireless terminal. The wireless terminal includes a serial port module 200 and an authentication module 300. After the wireless terminal is started up, a command input function of the serial port module 200 in a Uboot mode is disabled. If the access authority of the serial interface of Uboot is to be enabled, the authentication request carrying the authentication request information is required to be inputted at a countdown phase when the wireless terminal is started up to enter a Uboot startup mode. The access authenticating method includes the following steps.

At S101, the serial port module 200 receives the authentication request carrying the authentication request information from the serial port of the wireless terminal.

At S102, the serial port module 200 acquires the authentication request information from the authentication request, and sends the authentication request information to the authentication module 300.

At S103, the authentication module 300 encrypts the authentication request information, where an encryption mode uses the same encryption mode as the pre-compared key validation information. In an embodiment, the first encryption algorithm is used for encryption, and includes AES, MD5 or SHA algorithms.

At S104, the key validation information and the encrypted authentication request information are validated.

At S105, if the validation fails, the key query information is sent to the serial port module 200.

At S106, the serial port module 200 outputs the received key query information, does not enable the access authority of the serial interface, and closes a serial port console.

In an embodiment, the access authenticating method may further include the following steps.

At S107, the key validation information is acquired according to the key query information. The key query information and the key validation information are acquired according to the same plaintext key. The key validation information is generated from the plaintext key by using the first encryption algorithm, and the key query information is generated from the plaintext key by using the second encryption algorithm. In an embodiment, the first encryption algorithm is different from the second encryption algorithm. The first encryption algorithm includes a symmetric encryption algorithm or a Hash algorithm; and the second encryption algorithm includes an asymmetric encryption algorithm. In an embodiment, the first encryption algorithm includes AES, MD5 or SHA algorithms, and the second encryption algorithm includes an RSA or an elliptic curve asymmetric encryption algorithm.

At S108, the plaintext key is carried to the serial port module 200 by means of the authentication request, and the serial port module 200 sends the plaintext key to the authentication module 300 for access authentication of the serial interface of the wireless terminal.

At S109, the plaintext key is encrypted, and the key validation information and the encrypted plaintext key are validated.

At S110, verification success information is sent to the serial port module 200.

At S111, the serial port module 200 activates the access authority of the serial interface of the wireless terminal.

Embodiment 4

Figure 4:
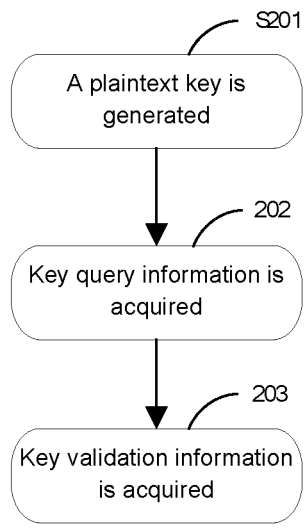
FIG. 4 is a schematic flowchart of a method for acquiring key validation information and key query information according to Embodiment III of the present disclosure.

FIG. 4 is a schematic flowchart of a method for acquiring key validation information and key query information according to Embodiment 3 of the present disclosure. The key validation information and the key query information for safe activating of a serial interface of a wireless terminal are generated and acquired by means of a key generation apparatus. Whether there is the key validation information is first queried, if so, the generation of the key validation information and the key query information is stopped, and if not, the method includes the following steps.

At S201, a plaintext key is generated. A random password is generated as the plaintext key according to a preset password strength policy. The password strength policy includes a minimum password character length and a minimum number of character types included (for example, uppercase, lowercase, numbers, special characters, etc.)

At S202, the plaintext key is encrypted by using a second encryption algorithm, so as to generate and store the key query information, where since the key query information does not need to be generated in a Uboot mode, the second encryption algorithm may use a complex asymmetric encryption algorithm; and the key query information is generated in a preset special key generation apparatus.

At S203, the plaintext key is encrypted by using a first encryption algorithm, so as to generate and store the key validation information; and since, during an authentication process, pre-validated authentication request information needs to be encrypted, in the Uboot mode, by using the first encryption algorithm, the first encryption algorithm needs to use a symmetric encryption algorithm or a Hash algorithm, and Uboot does not need to be integrated with a complex encryption algorithm library, such that an encryption process is simple and easy to implement. In an embodiment, the first encryption algorithm includes an encryption algorithm such as AES, MD5 or SHA.

This embodiment further provides a wireless terminal. The wireless terminal includes a processor and a memory. The processor is configured to execute one or more programs stored in the memory, so as to implement steps of the interface access authenticating method described in Embodiment 1. The memory is coupled to the processor.

This embodiment further provides a computer-readable storage medium. The computer-readable storage medium includes volatile or non-volatile, removable or non-removable media implemented in any methods or technologies for storing information (such as computer readable instructions, data structures, computer program modules, or other data). The computer-readable storage medium includes, but is not limited to, a Random Access Memory (RAM), a Read-Only Memory (ROM), an Electrically Erasable Programmable read only memory (EEPROM, electrically erasable programmable read only memory)), a flash memory or other memory technology, Compact Disc Read-Only Memory (CD-ROM), Digital Versatile Disc (DVD) or other optical disk storage, a disk box, a magnetic tape, a disk storage or other magnetic storage apparatuses, or any other medium that can be used to store desired information and that may be accessed by a computer.

This embodiment further provides a computer program (which is also called computer software). The computer program may be distributed on a computer-readable storage medium, and may be executed by a computing apparatus, so as to implement at least one step of the interface access authenticating method in the Uboot mode, the access authenticating method of a serial interface of a wireless terminal, and the method for acquiring key validation information and key query information in Embodiment 1, Embodiment 3 and Embodiment 4. In addition, in some cases, at least one step shown or described may be executed in an order different from that described in the above embodiments.

Figure 5:
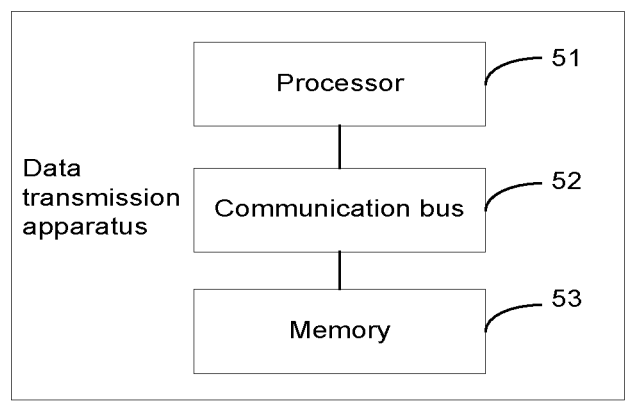
FIG. 5 is a schematic structural diagram of a wireless terminal according to another embodiment.

This embodiment further provides a data transmission apparatus. FIG. 5 is a schematic structural diagram of a wireless terminal according to another embodiment. The wireless terminal includes a processor 51, a memory 53 and a communication bus 52.

The communication bus 52 is configured to achieve connection communication between the processor 51 and the memory 52.

The processor 51 is configured to execute one or more computer programs stored in the memory 53, so as to implement at least one step of a data transmission method described in Embodiment 1.

It is to be understood that, in some cases, at least one step shown or described may be executed in an order different from that described in the above embodiments.

This embodiment further provides a computer program product. The computer program product includes a computer-readable apparatus. The computer-readable apparatus stores the computer program as shown above. In this embodiment, the computer-readable apparatus may include the computer-readable storage medium as shown above.

In an embodiment of the present disclosure, since key validation information and key query information used by each wireless terminal for interface authentication are randomly generated and unique, and interface access authority of the wireless terminal is controlled at a startup phase of a Uboot mode, high security is achieved. In another embodiment of the present disclosure, an interface authentication password supports a password query function. If research and development or testing personnel do not know an authentication password, the research and development or testing personnel may input an authentication secret order for query, and then use a tool or an IT system to decrypt into a plaintext key, such that user experience may be improved. The key validation information and the key query information are generated by a preset key generation apparatus. The preset key generation apparatus may be operated in a non-Uboot mode, such that the implementation difficulty of the interface access authenticating method disclosed in the present disclosure may be reduced.

It may be seen that, those skilled in the art should understand that all or some of the steps in the method disclosed above, and functional modules/units in the system and the apparatus may be implemented as software (which may be implemented by computer program codes executable by a computing apparatus), firmware, hardware, and an appropriate combination thereof. In the implementation of the hardware, the division between the functional modules/units described above does not necessarily correspond to the division of physical components. For example, a physical component may have a plurality of functions, or a function or step may be performed cooperatively by a plurality of physical components. Some or all of physical components may be implemented as software executed by a processor, such as a central processing unit, a digital signal processor or a microprocessor, or as hardware, or as an integrated circuit, such as an application specific integrated circuit.

In addition, communication media typically includes computer readable instructions, data structures, computer program modules, or other data in a modulated data signal such as a carrier wave or other transport mechanism, and may include any information delivery media, as is well known to those of ordinary skill in the art. In this way, the present disclosure is not limited to any specific combination of hardware and software.

The above content is a further detailed description of the embodiments of the present disclosure with reference to specific implementations, and it cannot be considered that the specific implementation of the present disclosure is limited to these descriptions. For those of ordinary skill in the technical field of the present disclosure, without departing from the concept of the present disclosure, some simple deductions or substitutions may be made, which may be regarded as belonging to the protection scope of the present disclosure.

What is claimed is:

1. A method for authenticating interface access of a wireless terminal in a Uboot mode, used for acquiring interface access authority of a wireless terminal and comprising:
   in response to an authentication request for interface access, acquiring authentication request key information carried by the authentication request;
   validating the authentication request key information according to preset key validation information;
   when a validation of the authentication request key information succeeds, acquiring interface access authority of a wireless terminal; and
   when the validation of the authentication request key information fails, outputting key query information, wherein the key query information and the key validation information are acquired according to a same plaintext key, acquiring the plaintext key according to the outputted key query information by means of a second encryption algorithm, taking the plaintext key as the authentication request key information to acquire the interface access authority of the wireless terminal.

2. The method for authenticating interface access according to claim 1, wherein the key query information and the key validation information are acquired according to the same plaintext key comprises:
   randomly generating the plaintext key according to a preset password strength policy; and
   generating the key validation information from the plaintext key by using a first encryption algorithm, and generating the key query information from the plaintext key by using a second encryption algorithm.

3. The method for authenticating interface access according to claim 2, wherein the password strength policy comprises a minimum password character length and a minimum number of character types included.

4. The method for authenticating interface access according to claim 2, wherein the first encryption algorithm is different from the second encryption algorithm; and the first encryption algorithm comprises a symmetric encryption algorithm or a Hash algorithm, and the second encryption algorithm comprises an asymmetric encryption algorithm.

5. The method for authenticating interface access according to claim 2, wherein the first encryption algorithm comprises Advanced Encryption Standard (AES), or Message-Digest Algorithm version.5 (MD5), or Secure Hash Algorithm (SHA) algorithms; and the second encryption algorithm comprises a Rivest Shamir Adleman (RSA) or an elliptic curve asymmetric encryption algorithm.

6. A wireless terminal, comprising:
   an interface activating module, configured to activate access authority of a serial interface of the wireless terminal;
   a storage module, configured to store key validation information and key query information which are preset by the wireless terminal, wherein the key query information and the key validation information are acquired according to a same plaintext key; and
   an authentication module, configured to, in response to an authentication request for interface access, acquire authentication request key information carried by the authentication request, and validate the authentication request key information according to preset key validation information; when a validation of the authentication request key information succeeds, acquire interface access authority of a wireless terminal; and when the validation of the authentication request key information fails, output the key query information, acquiring the plaintext key according to the outputted key query information by means of a second encryption algorithm, taking the plaintext key as the authentication request key information to acquire the interface access authority of the wireless terminal.

7. The wireless terminal according to claim 6, further comprising:
   an encryption module, configured to encrypt the authentication request key information according to a first preset encryption algorithm, so as to cause the authentication module to validate the encrypted authentication request key information according to the key validation information.

8. The wireless terminal according to claim 7, wherein the encryption module (140) is further configured to randomly generate the plaintext key according to a preset password strength policy; and generate the key validation information from the plaintext key by using a first encryption algorithm, and generate the key query information from the plaintext key by using a second encryption algorithm.

9. A wireless terminal, comprising a processor and a memory, wherein the memory is coupled to the processor; and the processor is configured to execute one or more programs stored in the memory, so as to implement steps of the method for authenticating interface access as claimed in claim 1.

10. A non-transitory computer-readable storage medium, storing one or more computer programs, wherein the one or more computer programs are executable by one or more processors, so as to implement steps of the method for authenticating interface access as claimed in claim 1.

11. A wireless terminal, comprising a processor and a memory, wherein the memory is coupled to the processor; and the processor is configured to execute one or more programs stored in the memory, so as to implement steps of the method for authenticating interface access as claimed in claim 2.

12. A wireless terminal, comprising a processor and a memory, wherein the memory is coupled to the processor; and the processor is configured to execute one or more programs stored in the memory, so as to implement steps of the method for authenticating interface access as claimed in claim 3.

13. A wireless terminal, comprising a processor and a memory, wherein the memory is coupled to the processor; and the processor is configured to execute one or more programs stored in the memory, so as to implement steps of the method for authenticating interface access as claimed in claim 4.

14. A wireless terminal, comprising a processor and a memory, wherein the memory is coupled to the processor; and the processor is configured to execute one or more programs stored in the memory, so as to implement steps of the method for authenticating interface access as claimed in claim 5.

15. A non-transitory computer-readable storage medium, storing one or more computer programs, wherein the one or more computer programs are executable by one or more processors, so as to implement steps of the method for authenticating interface access as claimed in claim 2.

16. A non-transitory computer-readable storage medium, storing one or more computer programs, wherein the one or more computer programs are executable by one or more processors, so as to implement steps of the method for authenticating interface access as claimed in claim 3.

17. A non-transitory computer-readable storage medium, storing one or more computer programs, wherein the one or more computer programs are executable by one or more processors, so as to implement steps of the method for authenticating interface access as claimed in claim 4.

18. A non-transitory computer-readable storage medium, storing one or more computer programs, wherein the one or more computer programs are executable by one or more processors, so as to implement steps of the method for authenticating interface access as claimed in claim 5.

* * * * *